(12) United States Patent
Kakani et al.

(10) Patent No.: US 9,830,621 B2
(45) Date of Patent: Nov. 28, 2017

(54) SYSTEMS AND METHODS FOR LAYERING CONTENT

(71) Applicant: Vdopia Inc., Fremont, CA (US)

(72) Inventors: Srikanth Kakani, Fremont, CA (US); Lloyd Lim, Fremont, CA (US)

(73) Assignee: VDOPIA INC., Fremont, CA (US)

( * ) Notice: Subject to any disclaimer, the term of this patent is extended or adjusted under 35 U.S.C. 154(b) by 109 days.

(21) Appl. No.: 14/211,146

(22) Filed: Mar. 14, 2014

(65) Prior Publication Data

US 2014/0279076 A1 Sep. 18, 2014

Related U.S. Application Data

(60) Provisional application No. 61/785,806, filed on Mar. 14, 2013.

(51) Int. Cl.
*G06Q 30/02* (2012.01)
*G06F 3/0481* (2013.01)

(52) U.S. Cl.
CPC .................. *G06Q 30/0277* (2013.01)

(58) Field of Classification Search
CPC .................................. G06Q 30/0277
USPC .................. 705/10, 14.73; 715/747, 763
See application file for complete search history.

(56) References Cited

U.S. PATENT DOCUMENTS

| | | | |
|---|---|---|---|
| 5,893,095 A * | 4/1999 | Jain | .................. G06F 17/30256 |
| 6,426,778 B1 | 7/2002 | Valdez, Jr. | |
| 7,917,644 B2 | 3/2011 | Vedantham et al. | |
| 8,522,277 B2 | 8/2013 | Gordon et al. | |
| 2008/0222504 A1 | 9/2008 | Chitturi | |
| 2008/0238938 A1 | 10/2008 | Eklund et al. | |
| 2010/0082661 A1 | 4/2010 | Beaudreau | |
| 2010/0153990 A1 * | 6/2010 | Ress | ...................... G06Q 30/02 725/34 |
| 2011/0035254 A1 * | 2/2011 | Ho | .................... G06F 17/30867 705/7.29 |

(Continued)

FOREIGN PATENT DOCUMENTS

| | | |
|---|---|---|
| KR | 10-2009-0005610 A | 1/2009 |
| WO | WO 97/12342 A1 | 4/1997 |
| WO | WO 2013/138370 A1 | 9/2013 |

OTHER PUBLICATIONS

A Model-Driven Method for the Development of Web Applications User Interaction Layer Ricardo A. C. de Souza, Roberto S. M. de Barros Published Jun. 1, 2008.*

(Continued)

*Primary Examiner* — Amanda Abrahamson
*Assistant Examiner* — Victoria Frunzi
(74) *Attorney, Agent, or Firm* — Haynes and Boone, LLP (57) ABSTRACT

Systems and methods are provided that facilitate the layering of content for display. The content may be included in a first layer and a second layer having user interface and other functionalities may be overlaid on the first layer to change the look and feel of the content without actually changing the content. The systems and methods further permit the first and second layer to communicate such that events and functions may be communicated from one layer to the other. As a result a developer may be able to add user interface elements into a second layer that can call functions from the first layer and control the content in the first layer.

20 Claims, 7 Drawing Sheets

(56) References Cited

U.S. PATENT DOCUMENTS

| | | | |
|---|---|---|---|
| 2011/0112914 A1* | 5/2011 | Geer, III | G06Q 30/00 |
| | | | 705/14.73 |
| 2012/0079401 A1* | 3/2012 | Huang | G06F 9/4443 |
| | | | 715/763 |
| 2012/0232988 A1 | 9/2012 | Yang et al. | |

OTHER PUBLICATIONS

PCT International Search Report dated Aug. 22, 2014, in related International Application No. PCT/US2014/027859.

* cited by examiner

SYSTEMS AND METHODS FOR LAYERING CONTENT

CROSS REFERENCE TO RELATED APPLICATIONS

Pursuant to 35 U.S.C. §119(e), this application claims priority to the filing date of U.S. Provisional Patent Application No. 61/785,806, filed on Mar. 14, 2013, the disclosure of which is hereby incorporated by reference in its entirety.

BACKGROUND

Technical Field

Embodiments disclosed herein are related to layering additional content, such as rich media, over an advertisement or other content. In particular, systems and methods disclosed herein may provide a fully programmable rich media layer over a content layer wherein the layers may communicate with one another and can synchronize information between the layers.

Related Art

Video ads on mobile is one of the fastest growing market segments for advertising. However, making advertising work on mobile devices poses certain problems for taking advantage of the growing market segment. One problem when designing a video ad playback system is the ability to make changes to the advertisement once a developer integrates software development tools into a mobile application. For example, if a video ad has an overlay of buttons, in order to change the labels in the buttons the developer of software tools has to provide a new version just to change the labels in the buttons, which may take time and relies on the third party developer to take action.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

Accordingly, there is a need for a system and method that for allows new features to be added without the need for a new version of software development tools.

Consistent with some embodiments, there is provided a device for displaying content. The device includes a network interface component configured to receive the content and instructions for layering the content, the instructions further comprising programming elements related to the content. The device also includes one or more processors configured to layer the content into a first layer and a second layer on top of the first layer based on the instructions, wherein the first layer includes a media portion of the content and the second layer includes rich media elements programmed to function based on the received instructions. The device further includes a display component configured to display the content including the second layer on top of the first layer.

A method for layering content is provided. The method for layering content includes receiving the content and instructions for layering the content, layering the content into at least a first layer and a second layer on top of the first layer. The first layer includes a media portion of the content, the second layer includes rich media user interface elements for controlling the media portion of the content, and the first layer and the second layer are capable of communicating events and functions between the first and second layer. The method may be embodied in computer-readable media.

Consistent with some embodiments, there is further provided a method for displaying a video advertisement. The method includes steps of receiving the video advertisement and associated instructions, layering the video advertisement in a first layer, programming a second layer according to the associated instructions, layering the programmed second layer over the first layer; and displaying the first layer and programmed second layer. The method may be embodied in computer-readable media.

Systems and methods as provided herein may provide layering a rich media layer over a content layer with the ability for the layers of rich media and content to communicate and pass information between one another. In particular, systems and methods as provided herein may allow a developer to update or change the rich media layer to change the look and feel of the content without actually changing the content. Although embodiments disclosed herein may not completely eliminate the need for new versions of software development tools, embodiments as described herein may reduce the time for integrating new features into software development tools by several times.

These and other embodiments will be described in further detail below with respect to the following figures.

Figure 1:
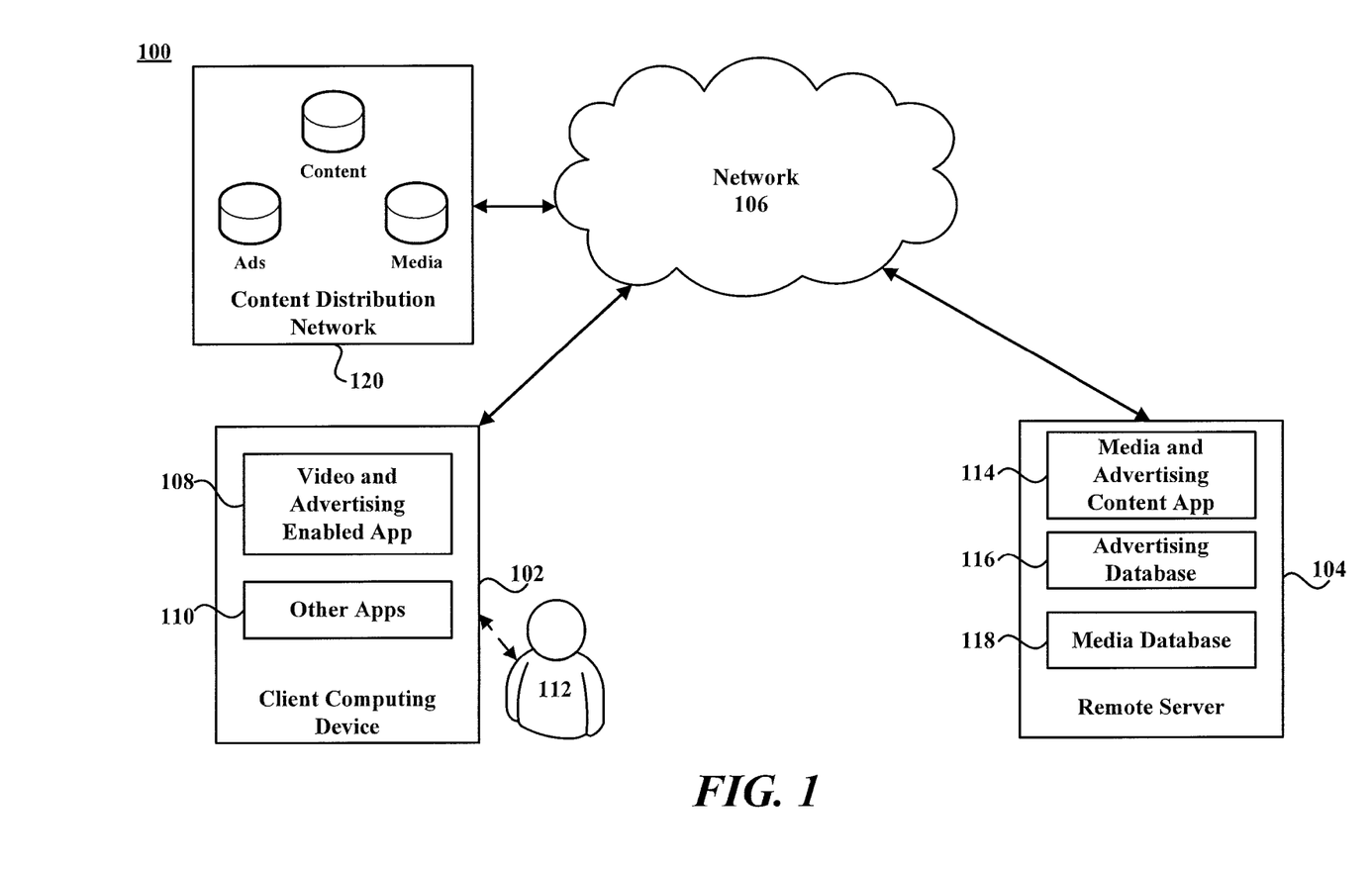
FIG. 1 is a block diagram of a networked system, consistent with some embodiments.

FIG. 1 is a block diagram of a networked system 100, consistent with some embodiments. System 100 includes a client computing device 102 and a remote server 104 in communication over a network 106. Remote server 104 may be an advertising content server that provides advertising to client computing device 102 for display by client computing device 102. Network 106, in one embodiment, may be implemented as a single network or a combination of multiple networks. For example, in various embodiments, network 106 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client computing device 102, in one embodiment, may be implemented using any appropriate combination of hardware and/or software configured for wired and/or wireless communication over network 106. For example, client computing device 102 may be implemented as a wireless telephone (e.g., smart phone), tablet, personal digital assistant (PDA), notebook computer, personal computer, a connected set-top box (STB) such as provided by cable or satellite content providers, or a video game system console, a head-mounted display (HMD) or other wearable computing device, including a wearable computing device having an eyeglass projection screen, and/or various other generally known types of computing devices. Consistent with some embodiments, client computing device 102 may include any appropriate combination of hardware and/or software having one or more processors and capable of reading instructions stored on a tangible non-transitory machine-readable medium for execution by the one or more processors. Consistent with some embodiments, client computing device 102 includes a machine-readable medium, such as a memory (not shown) that includes instructions for execution by one or more processors (not shown) for causing client computing device 102 to perform specific tasks.

For example, such instructions may include a video and advertising enabled application 108 for playing media such as videos, audio, and video advertisements that may include rich media layered over the base video and/or audio content. In some embodiments, videos and other media played by video and advertising enabled application 108 may include videos that are received by client computing device 102 over network 106 from, for example, remote server 104. Moreover, the advertisements that may also be played by video and advertising enabled application 108 may be retrieved from remote server 104 by client computing device 102. Video and advertising enabled application 108 may include a software program including instructions that, when executed by one or more processors of client computing device 102, cause client computing device 102 to display two or more layers of content, including a second layer that may be fully programmable and include elements that may change a look and feel of a first layer without actually changing anything displayed in the first layer. In some embodiments, the first layer may include base content such as an image, a series of frames of images, a video, a video advertisement, and the like. The second layer may include a graphical user interface (GUI) that may be enabled by rich media that may be layered over the first layer including the base content. Video and advertising enabled app 108 may be is configured to interface and communicate with remote server 104, other servers managed by media content providers or advertising content providers via network 106.

Video and advertising enabled app 108 may include a software development kit ("SDK") that includes a variety of software development tools for interfacing between hardware and software of client computing device 102 to achieve a particular function, such as retrieving, layering, and displaying advertisements. Video and advertising enabled app 108 may also include an application programming interface ("API"), which may be processor-executable instructions or code that interface with and allow software components to communicate with one another to achieve a particular function or functions. The API may be written in numerous know types of programming languages such as Hypertext Markup Language ("HTML"), extensible markup language ("XML"), and C++, and Java®, for example. Client computing device 102 may also include other applications 110 as may be desired in one or more embodiments to provide additional features available to user 112. For example, applications 110 may include interfaces and communication protocols that allow the user to receive and transmit information through network 106 and to remote server 104 and other online sites. Applications 110 may also include security applications for implementing client-side security features, programmatic client applications for interfacing with appropriate APIs over network 106 or various other types of generally known programs and/or applications. Applications 116 may include mobile apps downloaded and resident on client computing device 102 that enables user 112 to access content through the apps.

Remote server 104 according to some embodiments, may be maintained by an advertising content provider and/or a media content provider, which may provide advertising content and/or media content to client computing device 102 over network 106. Remote server 104 may include at least advertising and media content application 114, which may be adapted to send advertising content from advertising database 116 and/or media content from media database 118 to client computing device 102 over network 106. Although remote server 104 is shown as capable of providing media content and advertising content, in some embodiments media content and advertising content may be provided by separate servers.

System 100 may also include a content distribution network 120 that may be in communication with client computing device 102 and remote server 104 over network 106. Content distribution network 120 may be one or a plurality of servers hosting content, media, and advertisements, that may be accessed by client computing device 102 and/or remote server 104 over network 106 to retrieve content, media, and/or advertisements. In some embodiments, remote server 104 may retrieve content, media, and/or advertisements from content distribution network 120, that may be stored in advertising database 116 or media database 118. Media and advertising content application 114 may then retrieve the content, media, or advertisements from advertising database 116 or media database 118, and format the content, media, or advertisements for sending to client computing device 102. In some embodiments, media and advertising content application 114 may provide a framework for displaying content, media, and advertisements to client computing device 102, including links to content distribution network 120, wherein client computing device 102 retrieves the applicable content, media, and advertisements, when video and advertising enabled application 108 is executing to display content, media, or advertisements based on the provided framework. In yet other embodiments, remote server 104 may provide a framework to content distribution network 120 for formatting content, advertisements, and media such that video and advertising enabled application 108 of client computing device 102 may be capable of retrieving content, media, and advertisements that are already formatted based on the provided framework from content distribution network 120.

Figure 2:
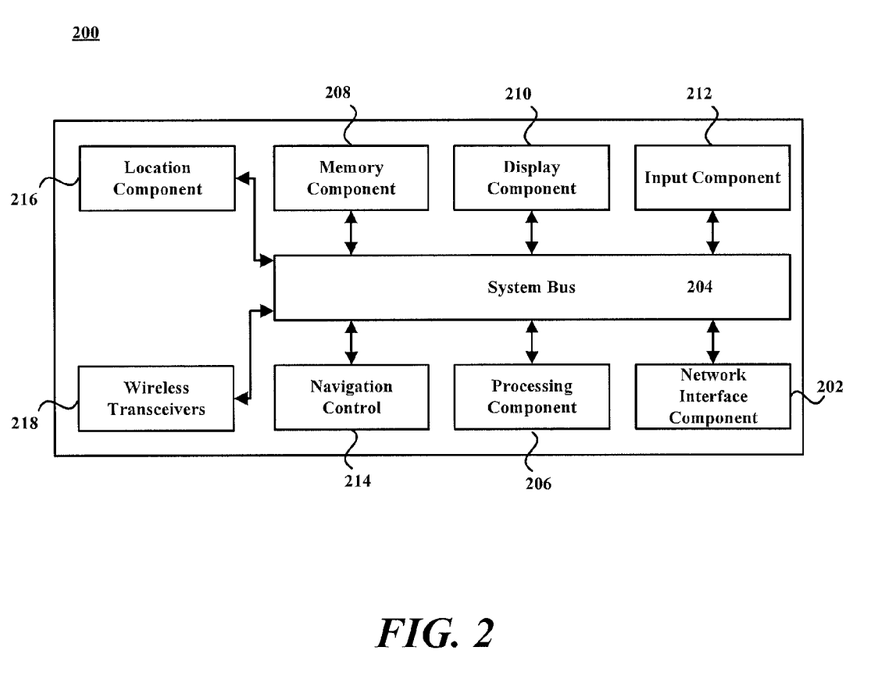
FIG. 2 is a diagram illustrating a computing system, consistent with some embodiments.

FIG. 2 is a diagram illustrating computing system 200, which may correspond to any of client computing device 102 or remote server 104, or content distribution network 120 consistent with some embodiments. Computing system 200 may be a mobile device such as a smartphone, a tablet computer, a personal computer, laptop computer, netbook, or tablet computer, set-top box, video game console, head-mounted display (HMD) or other wearable computing device as would be consistent with client computing device 102. Further, computing system 200 may also be a server or one server amongst a plurality of servers, as would be consistent with remote server 104 or content distribution network 120. As shown in FIG. 2, computing system 200 includes a network interface component (NIC) 202 configured for communication with a network such as network 106 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 110. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 106.

Consistent with some embodiments, computing system 200 includes a system bus 204 for interconnecting various components within computing system 200 and communicating information between the various components. Such components include a processing component 206, which may be one or more processors, micro-controllers, graphics processing units (GPUs) or digital signal processors (DSPs). Computing system 200 may also include a memory component 208, which may correspond to a random access memory (RAM), an internal memory component, a read-only memory (ROM), or an external or static optical, magnetic, or solid-state memory. Memory component 208 of remote server 104 may correspond to one or more databases including advertising database 116 or media database 118, in some embodiments. Consistent with some embodiments, computing system 200 further includes a display component 210 for displaying information to a user 112 of computing system 200. Display component 210 may be a liquid crystal display (LCD) screen, an organic light emitting diode (OLED) screen (including active matrix AMOLED screens), an LED screen, a plasma display, or a cathode ray tube (CRT) display. In some embodiments, processing component 206 may be configured to render information for display by display component 210. The rendered information may include a user interface, graphics, and the like. In some embodiments, the rendered information may include at least two layers, including a first layer including base content and a second layer overlaid on top of the first layer and including elements that may change the look and the feel of the first layer without actually altering the first layer.

Computing system 200 may also include an input component 212, allowing for a user of computing system 200, such as user 112, to input information to computing system 200. An input component 212 may include, for example, a keyboard or key pad, whether physical or virtual. Computing system 200 may further include a navigation control component 214, configured to allow a user to navigate along display component 210. Consistent with some embodiments, navigation control component 214 may be a mouse, a trackball, or other such device. Moreover, if computing system 200 includes a touch screen, display component 210, input component 212, and navigation control 214 may be a single integrated component, such as a capacitive sensor-based touch screen.

Computing system 200 may further include a location component 216 for determining a location of computing system 200. In some embodiments, location component 216 may correspond to a GPS transceiver that is in communication with one or more GPS satellites. In other embodiments, location component 216 may be configured to determine a location of computing system 200 by using an internet protocol (IP) address lookup, or by triangulating a position based on nearby telecommunications towers or wireless access points (WAPs). Location component 216 may be further configured to store a user-defined location in memory component 208 that can be transmitted to a third party for the purpose of identifying a location of computing system 200. Computing system 200 may also include one or more wireless transceivers 220 that may each include an antenna that is separable or integral and is capable of transmitting and receiving information according to one or more wireless network protocols, such as Wi-Fi™, 3G, 4G, LTE, RF, NFC, IEEE 802.11a, b, g, n, ac, or ad, etc. In some embodiments, wireless transceivers 218 and network interface component 202 may facilitate sending and receiving information over network 106 wirelessly.

Computing system 200 may perform specific operations by processing component 206 executing one or more sequences of instructions contained memory component 208, with such instructions possibly corresponding to one or more applications described in FIG. 1. In other embodiments, hard-wired circuitry may be used in place of or in combination with software instructions to implement the present disclosure. Logic may be encoded in a computer readable medium, which may refer to any medium that participates in providing instructions to processing component 206 for execution, including memory component 208. Consistent with some embodiments, the computer readable medium is tangible and non-transitory. In various implementations, non-volatile media includes optical or magnetic disks, volatile media includes dynamic memory, and transmission media includes coaxial cables, copper wire, and fiber optics, including wires that comprise system bus 204. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled to network 106 may perform instruction sequences to practice embodiments consistent with the present disclosure in coordination with one another. Network interface component 202 may cooperate with wireless transceivers 218 to send and receive messages, data and one or more data packets, information and instructions, including one or more programs (i.e., application code). Received program code may be executed by processing component 206 as received and/or stored in memory component 208.

Figure 3:
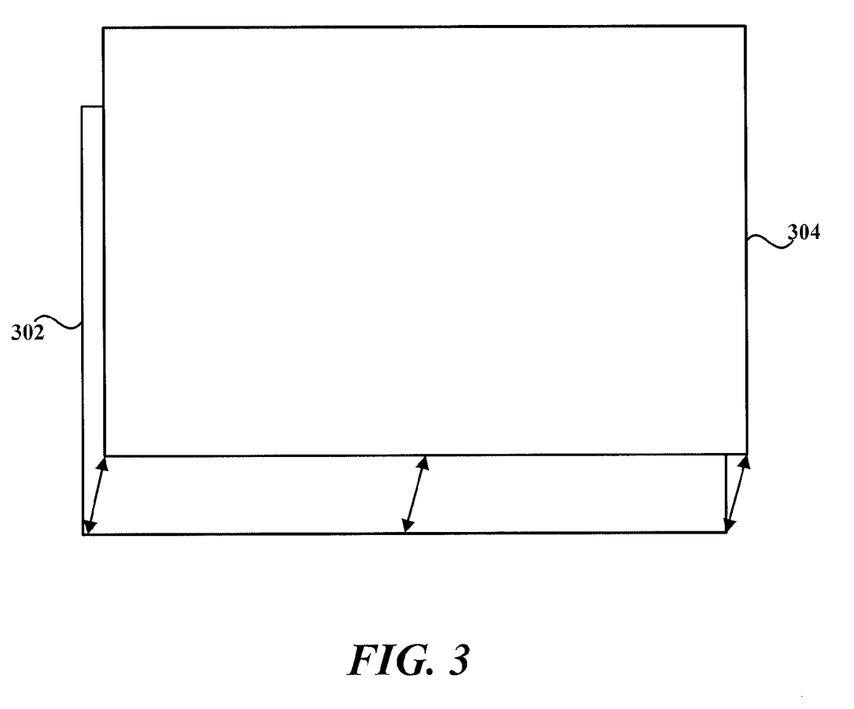
FIG. 3 is a diagram conceptually illustrating a second playback layer added on top of a first playback layer, consistent with some embodiments.

FIG. 3 is a diagram conceptually illustrating a second playback layer added on top of a first playback layer, consistent with some embodiments. Video and advertising enabled application 108 may include an SDK that manages video advertisements received from remote server 104 for creating at least two layers for serving advertisements, content, and/or other media. In some embodiments, the SDK may be provided by remote server 104 and may be used to provide a framework for displaying content, media, and advertisements on client computing device 102. First layer 302 may be a content layer that may be configured for standard video playback and may be generated by, for example, video and advertising enabled application 108. In some embodiments, first layer 302 is not updated frequently or often, and may include the base content of a video advertisement. Moreover, first layer 302 may be layered over a native media player of client computing device 102 that may be provided by an operating system of client computing device 102 or may be provided by a third party and installed on client computing device 102, or provided by video and advertising enabled application 108. Further, first layer 302 may be capable of receiving updates about advertisements, media, or other content from the native media player using one or more API functions, the updates including updates of timing, location, and orientation of the content in first layer 302. Second layer 304 may be a programmable rich media layer and may be layered over first layer 302. In some embodiments, second layer 304 may be programmable to the extent allowed by the base operating system components such that second layer 304 may be programmable to fully control certain functionalities in first layer 302. Although FIG. 3 illustrates first layer 302 and second layer 304, additional layers may also be added including an extension layer of first layer 302 or second layer 304 that processes or handles interactions made with first layer 302 or second layer 304 by calling functions and sending to first layer 302 or second layer 304 as needed.

Rich media may refer to a broad range of digital interactive media that may be downloadable or may be embedded in a web page and exhibits dynamic motion that may occur over time or in direct response to user interaction. Rich media loaded into and layered into second layer 304 may be enabled by or generated using HTML version 5 ("HTML5"). In some embodiments, second layer 304 may be generated by video and advertising enabled application 108 based on the included SDK using any object that enables HTML or JavaScript playback, such as WebView in the iOS™ operating system. In some embodiments, second layer 304 may be generated to be mostly transparent so as not to obscure first layer 302. Moreover, second layer 304 may include base programming and instructions, along with features, elements, and functionalities that are fully programmable, such that second layer 304 may be updated or changed based on instructions received from a server such as remote server 304 or other source. In some embodiments, second layer 304 may be developed in JavaScript.

In some embodiments, processing component 206 may execute an API stored in any memory component 208 for allowing communication between first layer 302 and second layer 304 so that second layer 304 may be synchronized with first layer 302 to facilitate the transmission of events, instructions, and additional information between first layer 302 and second layer 304 as executed by the API that defines functions for basic communication between first layer 302 and second layer 304. In some embodiments, the API may be received from remote server 104. Moreover, video and advertising enabled application 108 may include the SDK which may use one or more functions of the API to allow communication between first layer 302 and second layer 304. For example, the API may be any API capable of defining and implementing the communication between first layer 302 and second layer 304, and may be programming language independent, including superset or subset APIs. In some embodiments, the events that second layer 304 may receive from first layer 302 may include events such as a start of an advertisement (AdStart), an end of an advertisement (AdEnd), the pausing of a displayed ad (AdPaused), and an update of the time remaining of an ad (Timeupdate).

In some embodiments, certain functions in the API may be available to first layer 302 and may be called from second layer 304. Moreover, certain functions in the API may be available to second layer 304 and may also be called by first layer 302. Table 1, below, lists an example of some API functions available to first layer 302 or second layer 304 and callable from first layer 302 or second layer 304. Although exemplary API functions have are shown and described in Table 1, additional API functions providing for additional features to be used by first layer 302 and second layer 304 and for further communication and interaction between first layer 302 and second layer 304.

TABLE 1

| | |
|---|---|
| getBoundingBoxCoordinates( ) | Returns a bounding box of an active area in second layer 304, with the coordinates indicating a position with respect to a top left position of second layer 304 (i.e., the top left corner of second layer 304 may be (0, 0) |
| playAd( ) | Plays a currently loaded advertisement. In some embodiments, the loaded advertisement may be received and/or retrieved from remote server 104 |
| muteAd( ) | Mutes the advertisement |
| unmuteAd( ) | Unmutes the advertisement |
| pauseAd( ) | Pauses the currently playing advertisement |
| skipAd( ) | Skips the current playing advertisement and goes directly to media content |
| handleClick(url) | Instructs first layer 302 to handle interactions, such as mouse clicks or presses sensed by a touch screen that happen inside of second layer 304 that second layer 304 is not able to handle internally |
| loadAdURL(url) | Instructs first layer 302 to load an advertisement uniform resource locator (URL) inside the playback system of first layer 302 provided by, for example, media player app 112 and advertising app 114 |
| doneCleanup( ) | Notifies first later 302 that cleanup has been completed |
| cleanup( ) | Instructs second layer 304 to begin cleanup operations. In some embodiments, first layer 302 may make this call to enable second layer 304 to complete cleanup operations |

TABLE 1-continued

| | |
|---|---|
| | before completely closing first layer 302. This call may also enable second layer 304 to report any final trackers to remote server 104 |
| initialize( ) | Instructs second layer 304 to initialize itself |

Second layer 304 may include additional functions or features. For example, second layer 304 may include functions for interacting with social media, e-mail, messaging, and the like. For example, user 112 may be able to interact with a social media function in second layer 304 to send the content or a link thereto to a contact. Moreover, second layer 304 may include functions for swiping an interface displayed in second layer 304 to show or hide the interface. Second layer 304 may also allow user 112 to skip an advertisement after a predetermined period of time, wherein second layer 304 displays rich media elements including a countdown indicating when user 112 can skip the advertisement.

In some embodiments, content which may be an advertisement, media content, or a combination of media content with an advertisement appended thereon, may be received by client computing device 102 from remote server 104. Moreover, remote server 104 may further send, along with the advertisement and/or media content, instructions that specify what is to be implemented in first layer 302 and second layer 304. In some embodiments, the instructions include instructions for programming second layer 304 to perform certain tasks with respect to first layer 302, or to define a certain look or feel of second layer 304 over first layer 302. In some embodiments, the instructions may be embodied in any client-server protocol, such as XML or JavaScript Object Notation (JSON), and may take advantage of the functions provided by the API to facilitate communication between first layer 302 and second layer 304 to allow user 112 to interact with features displayed in second layer 304 to control portions of first layer 302. Based on the received instructions, client computing device 102 may load portions of the received content in first layer 302 and second layer 304 as defined by the instructions, and then first layer 302 and second layer 304 may further communicate based on the API, as described above. In some embodiments, client computing device 102 may load the content, which may be a video advertisement, in first layer 302, and then load a user interface (UI), or other distinguishing overlay for the video advertisement in second layer 304. Consequently, even if the video advertisement remains the same over time, a developer can change the look, feel, and functionality of the video advertisement by including instructions for programming second layer 304 to have a particular look, feel, or functionality. An example of XML instructions that remote server 104 may send to client computing device 102 along with an advertisement and/or media content is provided below in Table 2:

TABLE 2

```
<ad>
<layer1>
    <ad url=http://example.com/ads/1.mp4>
    <ad duration=5s>
</layer1>
<layer2>
    <![CDATA[
<html>
<head>
```

TABLE 2-continued

```
<script language='javascript'>
    function initialize( ) {
        callInitialTrackers( );
        coordinates=layer1.getBoundingBoxCoordinates( );
        var x=getXfromCoordinates(coordinates);
        var y=getYfromCoordinates(coordinates);
        var width=getWidthfromBBox(coordinates);
        var height=getHeightfromBBox(coordinates);
        body.setX(x);
body.setY(y);
        body.setWidth(width);
        body.setHeight(height);
    }
    function cleanup( ) {
      callFinalTrackers( );
}
    function handleLayer1Event(event, value) {
        switch (event) {
            case "AdStart":
                break;
            case "AdEnd":
                break;
            case "AdPaused":
                var pauseTime=value;
                break;
            case "TimeUpdate":
                var currTime=value;
                break;
            }
}
</script>
<body>
  .
  .
  .
</body>
</html>
]]>
</layer2>
```

In some embodiments, user 112 may be capable of interacting with the base content in first layer 302 that triggers an action on second layer 304. For example, user 112 may interact with content elements loaded into first layer 302 that causes second layer 304 to be changed. Second layer 304 may be changed to match a scene displayed in first layer 302, match a color being displayed in first layer 302, and the like. Second layer 304 may receive a function call from first layer 302 that may cause second layer 304 to retrieve different rich media to be loaded into second layer 304 and overlaid on to first layer 302.

Figure 4:
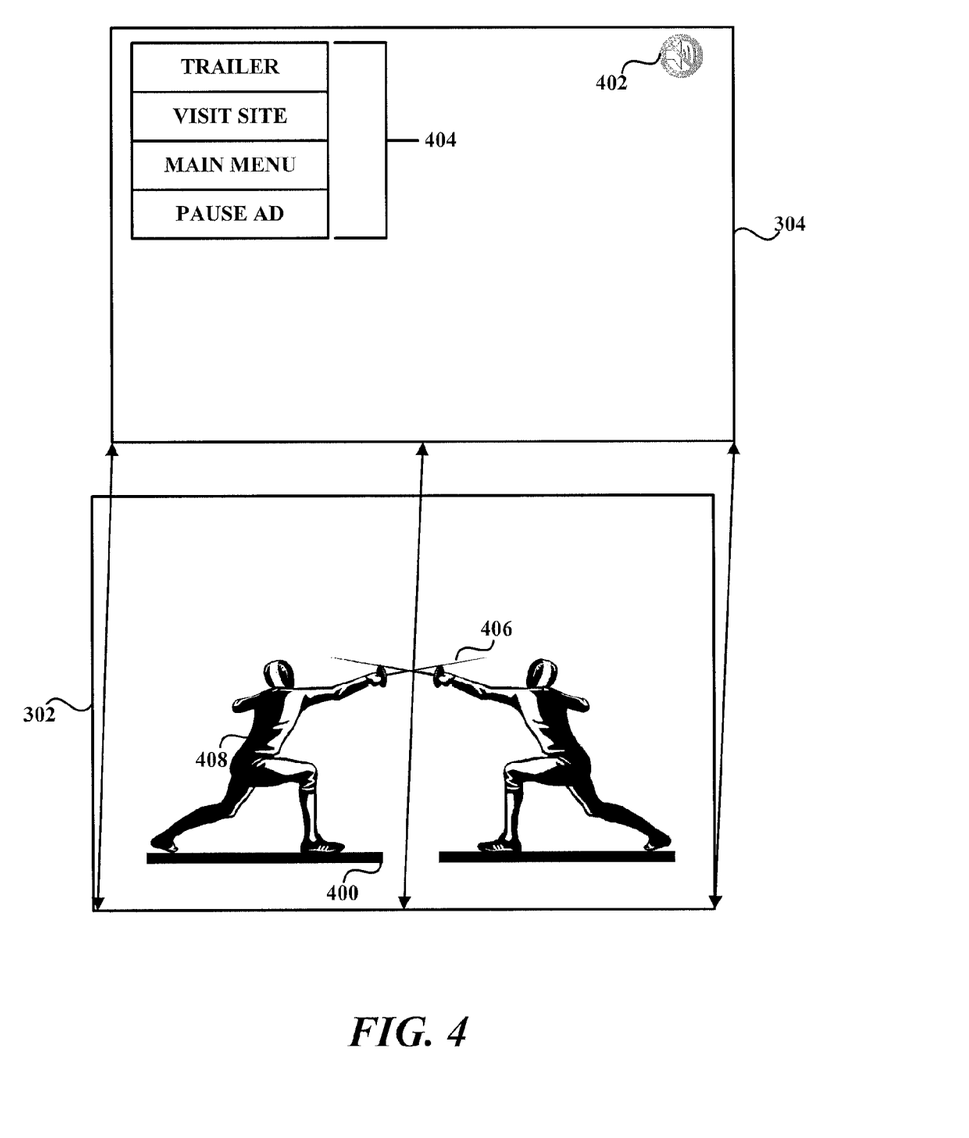
FIG. 4 is a diagram illustrating an example of layering content in a first layer and layering an interface to change the look and feel of the content in a second layer, consistent with some embodiments.

FIG. 4 is a diagram illustrating an example of layering content 400 in first layer 302 and an interface to change the look and feel of content 400 in second layer 304, consistent with some embodiments. As shown in FIG. 4, content 400, which may be an advertisement, media, or a combination thereof such as a video advertisement, may be displayed in first layer 302. Rich media features that may include UI elements such as a mute/unmute button 402 and a menu of additional features 404 may be displayed in second layer 304 that is overlaid on top of first layer 302. In general, elements for controlling a playback and user experience of content 400 in first layer 302 may be included and displayed in second layer 304. In some embodiments, if user 112 selects mute/unmute button 402, second layer 304 may call the muteAd( ) or unmuteAd( ) API function from first layer 302 to mute or unmute the content 400. Similarly, if user 112 selects the pause ad button from menu 404, second layer 304 may call the pauseAd( ) API function from first layer 302 to pause content 400.

Because second layer 304 is programmable and capable of communicating with first layer 302 different content 400 formats may be easily supported since functions related to content 400 rendered in first layer 302 may be called from second layer 304 which is layered on top of first layer 302. Moreover, content providers providing content into media database 118 and advertising database 116 on remote server 104 do not need to update client applications, such as video and advertising enabled app 112 on client computing device 102, or the SDKs for these apps. Instead, providers may provide instructions specifying what layer content 400 and other features are to be displayed or rendered in along with the content. In some embodiments, content displayed in first layer 302 may be written in a different programming language than rich media that is displayed in second layer 304.

Further, developers and providers may be able to essentially update the content, such as a video advertisement which is not updated often, by programming second layer 304 to have a particular look and feel. For example, the first time content 400 is loaded by a client computing device 102, content 400 may have features such as mute/unmute button 402, menu 404, and a link 406 to a site selling the fencer's foil layered over the content in programmable second layer 304. Another time content 400 is loaded by a client computing device, the base content 400 may remain the same, but the provider or developer may be able to program second layer 304 to also include a link 408 to a site selling the fencer's armor. Consequently, the provider or developer can change what is displayed to user 112 without needing an update to the base content 400. For example, if the base content 400 is a video advertisement, a provider or developer with the SDK to layer the content as described herein, can change the look and feel of the video advertisement by programming second layer 304 to have certain features without the need to change the base video advertisement. Moreover, in some embodiments, interaction by user 112 with base content 400 may cause first layer 302 to call an API function from second layer 304 that may change the look and feel of second layer 304, such as providing a different skin for menu 404, or changing the interface displayed in second layer 304. In some embodiments, the SDK may be provided to an end user, such as may be user 112 associated with client computing device 102. In some embodiments, the SDK may be provided to content distribution network 120 for creating video advertisements or frameworks of video advertisements that may be sent to client computing device 102 for display.

Figure 5:
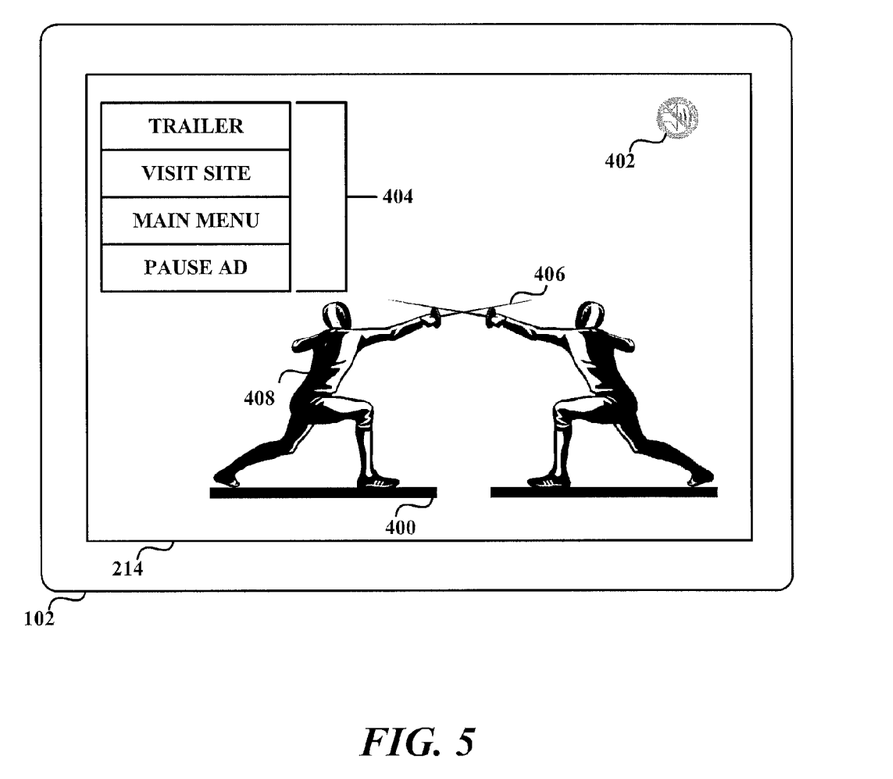
FIG. 5 is a diagram illustrating a client computing device displaying the first and second layers of content, consistent with some embodiments.

FIG. 5 is a diagram illustrating client computing device 102 displaying first 302 and second 304 layers of content, consistent with some embodiments. As shown in FIG. 54, client computing device 102 may display first layer 302 and second layer 304 of content on display component 214 such that user 112 viewing client computing device 102 is able to see content 400 from first layer 302 and mute/unmute button 402, menu of additional features 404, and link to fencer's armor 408 from second layer 304 seamlessly displayed. User 112 may then interact with the UI and other features from second layer 304, such as mute/unmute button 402 to call API functions muteAd( ) or unmuteAd( ) API function from first layer 302 to mute or unmute the content 400. User 112 may further interact with link 408 to visit a website providing more information about the fencer's armor, or a website selling the fencer's armor. Other features are able to be included in second layer 304, and may be updated by a developer and included in instructions sent from remote server 104 along with content 400 to change the look and feel of content 400 without actually changing the content or the content delivery mechanism.

Figure 6:
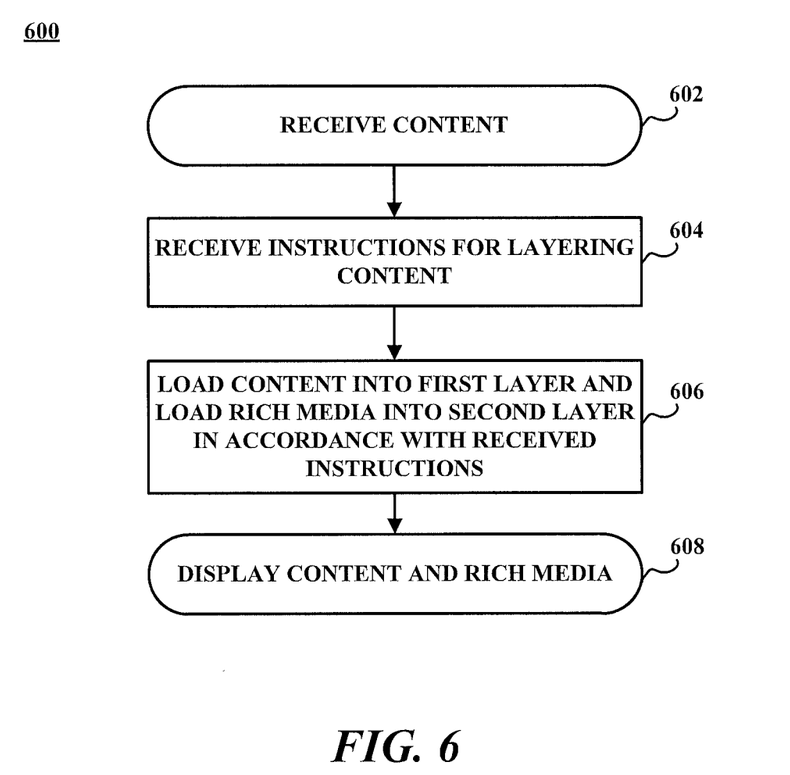
FIG. 6 is a flowchart illustrating a process for displaying content on client computing device, consistent with some embodiments.

FIG. 6 is a flowchart illustrating a process 600 for displaying content on client computing device 102, consistent with some embodiments. For the purpose of illustration, FIG. 6 may be described with reference to any of FIGS. 1-5. Process 600 shown in FIG. 6 may be embodied in computer-readable instructions for execution by one or more processors such that the steps of the method may be performed by processing component 206 of client computing device 102. In some embodiments, video and advertising enabled application 108 may include instructions for performing one or more steps shown in FIG. 6. As shown in FIG. 6, process 600 begins when client computing device 102 receives content from remote server 104 (602). In some embodiments, the received content may include media, advertisements, a combination of media and advertisements such as a video advertisement, and rich media. Client computing device 102 may then receive instructions for layering the received content (604). In some embodiments, the received instructions may include instructions for layering the content as base content 400 in first layer 302 and rich media in a programmable second layer 304. The received instructions may further include instructions for programming the programmable second layer 304 to have a particular look, feel, and/or function or functions. The received instructions may be received along with the content a and may be embedded in any client-server object, such as XML, or JSON. In some embodiments, steps 602 and 604 may be performed simultaneously such that the content and the instructions are received at the same time, or in different orders such that the instructions are received before the content. Processing component 206 of client computing device 102 may then load the received content into first layer 302 and load the received rich media into second layer 304 in accordance with the received instructions (606). In some embodiments, base content 400 such as media, an advertisement, or a combination of media and an advertisement such as a video advertisement, may be loaded in first layer 302, and rich media may be loaded in second layer 304 and programmed according to the received instructions. In some embodiments, rich media in second layer 304 may be programmed to have a particular look and feel, or UI elements of what will be displayed to user on a display component 214 of client computing device. In some embodiments, elements loaded and layered in first layer 302 and second layer 304 may be able to communicate with one another and pass information between one another so that, for example, second layer 304 is synchronized with first layer 302 and interactions made with second layer 304 trigger actions in first layer 302 and vice versa. Display component 214 of client computing device 102 may then display the layered content and rich media (608). The layered content in first layer 302 may include a video advertisement. The layered rich media in second layer 304 may include volume controls such as mute/unmute button 402 and a menu or additional actions 404 that user 112 may be able to take with respect to content 400. Moreover, any actions taken by user in second layer 304 may be passed to first layer 302 to effect the action, and vice versa.

Figure 7:
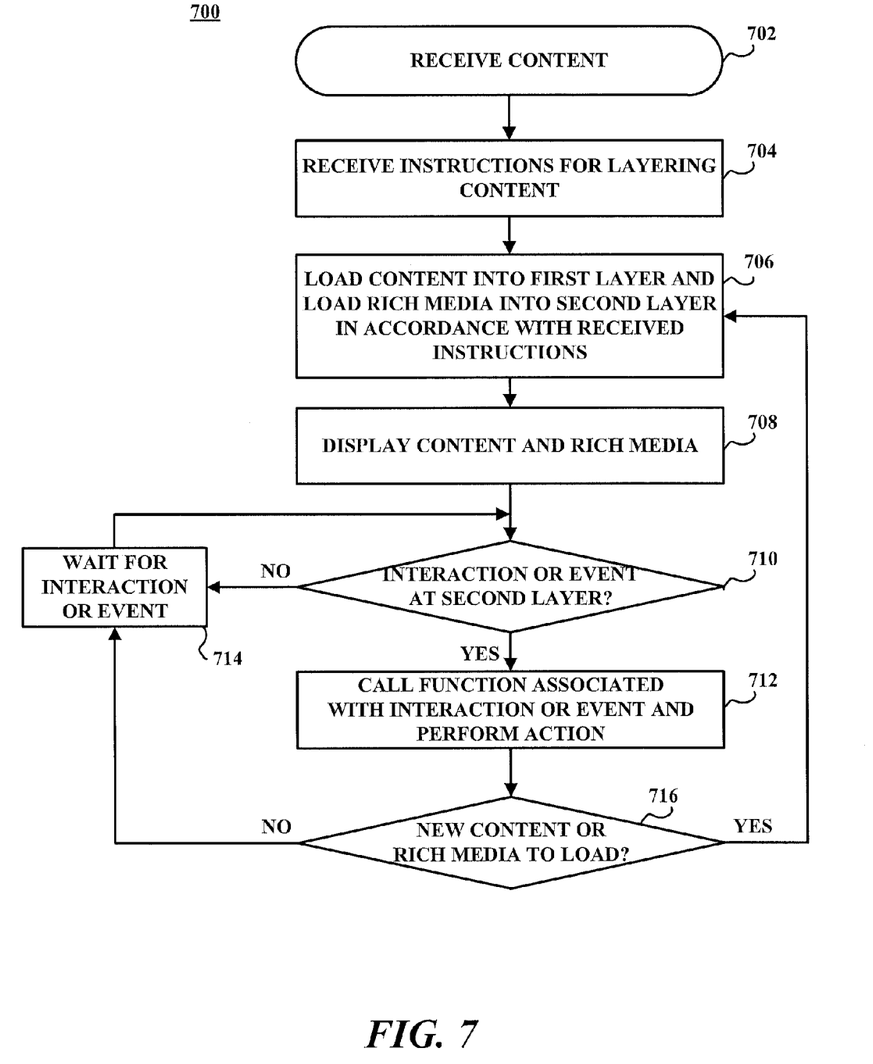
FIG. 7 is a flowchart illustrating a process for displaying layered content and performing functions on the content based on a user interface layered over the content, consistent with some embodiments.

FIG. 7 is a flowchart illustrating a process 700 for displaying layered content and performing functions on the content based on a user interface layered over the content, consistent with some embodiments. For the purpose of illustration, FIG. 7 may be described with reference to any of FIGS. 1-5. Process 700 shown in FIG. 7 may be embodied in computer-readable instructions for execution by one or more processors such that the steps of the method may be performed by processing component 206 of client computing device 102. In some embodiments, video and advertising enabled application 108 may include instructions for performing one or more steps shown in FIG. 7. As shown in FIG. 7, process 700 begins when client computing device 102 receives content from remote server 104 (702). In some embodiments, the received content may include media, advertisements, a combination of media and advertisements such as a video advertisement, and rich media. Client computing device 102 may then receive instructions for layering the received content (704). In some embodiments, the received instructions may include instructions for layering the content as base content 400 in first layer 302 and rich media in a programmable second layer 304. The received instructions may further include instructions for programming the programmable second layer 304 to have a particular look, feel, and/or function or functions. The received instructions may be received along with the content and may be embedded in any client-server object, such as XML, or JSON. In some embodiments, steps 702 and 704 may be performed simultaneously such that the content and the instructions are received at the same time, or in different orders such that the instructions are received before the content.

Processing component 206 of client computing device 102 may then load the received content into first layer 302 and load the received rich media into second layer 304 in accordance with the received instructions (706). In some embodiments, base content 400 such as media, an advertisement, or a combination of media and an advertisement such as a video advertisement, may be layered in first layer 302, and rich media may be layered in second layer 304 and programmed according to the received instructions. In some embodiments, rich media in second layer 304 may be programmed to have a particular look and feel, or UI elements of what will be displayed to user 112 on a display component 214 of client computing device. In some embodiments, elements layered in first layer 302 and second layer 304 may be able to communicate with one another and pass information between one another so that, for example, second layer 304 is synchronized with first layer 302. Display component 214 of client computing device 102 may then display the layered content and rich media (708). The layered content in first layer 302 may include a video advertisement. The layered rich media in second layer 304 may include volume controls such as mute/unmute button 402 and a menu or additional actions 404 that user 112 may be able to take with respect to content 400. When an interaction with the layered rich media in second layer 304 or an event in second layer 304 occurs (710), a function corresponding to the interaction may be called such that an action associated with the interaction or event may be performed (712, but otherwise waits for an interaction or event to occur (714). For example, if user 112 selects mute/unmute button 402, API functions muteAd( ) or unmuteAd( ) may be called from first layer 302 and then may be performed on first layer 302 to mute or unmute content 400 that may be playing on client computing device 102. In some embodiments, the function called and action performed associated with the interaction or event may involve loading new content into first layer 302 or new rich media into second layer 304 (716). When there is new content or rich media to load processing component 206 of client computing device 102 may load the content into first layer 302 and load the rich media into second layer 304 in accordance with instructions (706) and then display the content and rich media (708). Otherwise, process 700 will wait for an interaction or event with second layer to occur (714). Although FIG. 7 describes an example where an interaction received at second layer 304 causes a function to be performed on first layer 302, an interaction received at first layer 302 may cause a function to be performed on second layer 304 using a similar process.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide layering a rich media layer over a content layer with the ability for the layers of rich media and content to communicate and pass information between one another. In particular, systems and methods as provided herein may allow a developer to update or change the rich media layer to change the look and feel of the content without actually changing the content. Although embodiments disclosed herein may not completely eliminate the need for new versions of software development tools, embodiments as described herein may reduce the time for integrating new features into software development tools by several times. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A computing device, comprising:
a memory component;
a display component;
a network interface component configured to receive content and instructions, the content and instructions including a video and a first plurality of user interface (UI) elements; and
one or more processors coupled to the network interface component, the memory component, and the display component, the one or more processors being configured to execute the instructions, the instructions causing the one or more processors to:
layer the video into a first layer and the first plurality of UI elements into a second layer;
in response to interaction, by a user, with the first plurality of UI elements, control playback of the content in the first layer;
display the second layer over the first layer on the display component;
receive a function call from the first layer in response to the user interacting with the content being played back in the first layer; and
in response to the function call:
retrieve a second plurality of UI elements, the second plurality of UI elements being different from the first plurality of UI elements and the second plurality of UI elements being configured to call one or more application programming interface (API) functions in the second layer that control the playback of the content in the first layer when one or more of the second plurality of UI elements are interacted with by the user;
add the second plurality of UI elements to the second layer; and
display the second plurality of UI elements in the second layer over the first layer on the display component.

2. The device of claim 1, wherein the video comprises an advertisement.

3. The device of claim 1, wherein the one or more processors are further configured to communicate events and functions between the first layer and the second layer.

4. The device of claim 3, wherein the one or more processors are further configured to communicate events and functions that control a media portion of the content in the first layer based on user interaction with the first plurality of UI elements or the second plurality of UI elements in the second layer.

5. The device of claim 3, wherein the memory component stores an application programming interface that defines functions for communication of events and functions between the first layer and the second layer.

6. The device of claim 5, wherein the application programming interface defines functions for user interaction with features displayed in the second layer to control portions of the first layer.

7. The device of claim 1, wherein the second plurality of UI elements is programmed to match a color being displayed in the first layer.

8. A method, comprising:
receiving, by a network interface component of a device, content and instructions, the content including video and a first plurality of user interface (UI) elements; and
executing the instructions by a processor, the instructions causing the processor to:
layer the video into a first layer and the first plurality of UI elements into a second layer;
in response to interaction, by a user, with the first plurality of UI elements, control playback of the video in the first layer;
display the second layer over the first layer on a display component;
receive a function call from the first layer in response to the user interacting with the content being played back in the first layer; and
in response to receiving the function call:
retrieve a second plurality of UI elements, the second plurality of UI elements being different from the first plurality of UI elements and the second plurality of UI elements being configured to call one or more application programming interface (API) functions in the second layer that control the playback of the video in the first layer when one or more of the second plurality of UI elements are interacted with by the user;
add the second plurality of UI elements to the second layer; and
display the second plurality of UI elements in the second layer over the first layer on the display component.

9. The method of claim 8, wherein the video comprises an advertisement.

10. The method of claim 8, wherein the instructions comprise at least one server-client object.

11. The method of claim 8, wherein the second layer is programmable to fully control certain functionalities of a media portion of the content in the first layer.

12. The method of claim 11, wherein the media portion of the content and the first plurality of UI elements and the second plurality of UI elements are programmed in different programming languages.

13. The method of claim 8, wherein the instructions cause the processor to further communicate events and functions between the first and second layers using an application programming interface that defines functions for the second layer to call events and functions from the first layer and defines functions for the first layer to call events and functions from the second layer.

14. The method of claim 13, wherein the application programming interface defines functions for user interaction with features displayed in the second layer to control portions of the first layer.

15. The method of claim 8, wherein the second plurality of UI elements is programmed to match a color being displayed in the first layer.

16. A non-transitory computer-readable medium including instructions that, when executed by one or more processors of a computing device, cause the computing device to perform a method, the method comprising:
receiving, by a network interface component, content and instructions, the content including video and a first plurality of user interface (UI) elements;
layering the video into a first layer and the first plurality of UI elements into a second layer;
in response to interaction, by a user, with the first plurality of UI elements, controlling playback of the video in the first layer;
displaying the second layer over the first layer on a display component;
receiving a function call from the first layer in response to a user interacting with the content being played back in the first layer; and
in response to receiving the function call:
retrieving a second plurality of UI elements, the second plurality of UI elements being different from the first plurality of UI elements and the second plurality of UI elements being configured to call one or more application programming interface (API) functions in the second layer that control the playback of the video in the first layer when one or more of the second plurality of UI elements are interacted with by the user;
adding the second plurality of UI elements to the second layer; and
displaying the second plurality of UI elements in the second layer over the first layer on the display component.

17. The non-transitory computer-readable medium of claim 16, wherein instructions are embedded in a client-server object.

18. The non-transitory computer-readable medium of claim 16, further comprising performing an action on the first layer by calling a function associated with an interaction or event with the second layer.

19. The non-transitory computer-readable medium of claim 16, further comprising performing an action on the second layer in response to an interaction or event with the first layer.

20. The non-transitory computer-readable medium of claim 16, wherein the second plurality of UI elements is programmed to match a color being displayed in the first layer.

\* \* \* \* \*